(12) United States Patent
Beaudoin et al.

(10) Patent No.: US 10,477,831 B2
(45) Date of Patent: Nov. 19, 2019

(54) SELF-DRYING LITTER BOX

(76) Inventors: Patrick Beaudoin, Quebec (CA);
Mario Royer, Quebec (CA)

( * ) Notice: Subject to any disclaimer, the term of this patent is extended or adjusted under 35 U.S.C. 154(b) by 115 days.

(21) Appl. No.: 13/372,281

(22) Filed: Feb. 13, 2012

(65) Prior Publication Data

US 2012/0204800 A1    Aug. 16, 2012

(51) Int. Cl.
*A01K 1/01* (2006.01)

(52) U.S. Cl.
CPC .................... *A01K 1/0107* (2013.01)

(58) Field of Classification Search
CPC ..... A01K 1/0114; A01K 1/0107; A01K 1/011
USPC .................................. 119/161, 165
See application file for complete search history.

(56) References Cited

U.S. PATENT DOCUMENTS

| | | | | |
|---|---|---|---|---|
| 2,963,003 A | * | 12/1960 | Oberg ................. | A01K 1/0114 119/166 |
| 3,332,397 A | * | 7/1967 | Vander Wall ........ | A01K 1/0107 119/166 |
| 3,377,990 A | * | 4/1968 | Mitcheil .............. | A01K 1/0107 119/165 |
| 3,476,083 A | * | 11/1969 | Vander Wall ........ | A01K 1/0107 119/166 |
| 3,796,188 A | * | 3/1974 | Bradstreet ........... | A01K 1/0114 119/166 |
| 4,095,559 A | | 6/1978 | Griffith | |
| 4,217,857 A | | 8/1980 | Geddie | |
| 4,602,593 A | * | 7/1986 | Gross ................... | A01K 1/0114 119/166 |
| 4,696,257 A | | 9/1987 | Neary et al. | |
| 4,771,731 A | * | 9/1988 | Derx .................... | A01K 1/0114 119/166 |
| 5,044,325 A | | 9/1991 | Miksitz | |
| 5,193,488 A | * | 3/1993 | Walton ................ | A01K 1/0107 119/166 |
| 5,353,743 A | * | 10/1994 | Walton .............. | 119/166 |

(Continued)

FOREIGN PATENT DOCUMENTS

| | | |
|---|---|---|
| CA | 1169308 | 6/1984 |
| EP | 1488690 | 6/2004 |

(Continued)

OTHER PUBLICATIONS

Decision of Rejection issued by EPO dated Mar. 28, 2018 in Application No. EP 12882842.3.

*Primary Examiner* — Thanh Pham
(74) *Attorney, Agent, or Firm* — Wells St. John P.S.

(57) ABSTRACT

Embodiments of a self-drying litter box are described herein that includes a tray-superposition arrangement having a lower tray and an upper tray. The upper tray is mounted onto the lower tray in spaced relationship so as to define an empty volume therebetween. The upper tray includes a bottom defining a surface capable of receiving litter material and waste material thereon and is provided with apertures for allowing air circulating through the bottom of the upper tray. The lower tray receives second litter material and any portion of the first litter and waste materials that falls from the upper tray through the apertures. The tray-superposition arrangement defines one or more ventilation openings for allowing air circulation between the empty volume and outside of the tray-superposition arrangement that dries litter and waste materials in the upper and lower trays.

18 Claims, 8 Drawing Sheets

(56) References Cited

U.S. PATENT DOCUMENTS

| | | | | |
|---|---|---|---|---|
| 5,367,984 | A | * | 11/1994 | Purnell ................ A01K 1/0107 |
| | | | | 119/165 |
| D364,944 | S | * | 12/1995 | Blaine ......................... D30/158 |
| 5,515,812 | A | * | 5/1996 | Faust .................... A01K 1/0114 |
| | | | | 119/166 |
| 5,749,317 | A | * | 5/1998 | Richey et al. ................ 119/166 |
| 5,983,831 | A | * | 11/1999 | Thompson ................... 119/165 |
| 6,009,836 | A | | 1/2000 | Neary et al. |
| 6,123,048 | A | | 9/2000 | Alkire et al. |
| 6,408,790 | B1 | * | 6/2002 | Maguire .............. A01K 1/0114 |
| | | | | 119/165 |
| 2004/0261727 | A1 | * | 12/2004 | Matsuo ................ A01K 1/0114 |
| | | | | 119/170 |

FOREIGN PATENT DOCUMENTS

| | | |
|---|---|---|
| WO | WO 0176358 | 10/2001 |
| WO | WO 2008/092243 | 8/2008 |
| WO | WO 2010/081183 | 7/2010 |
| WO | PCT-CA2012-00753 | 2/2013 |

\* cited by examiner

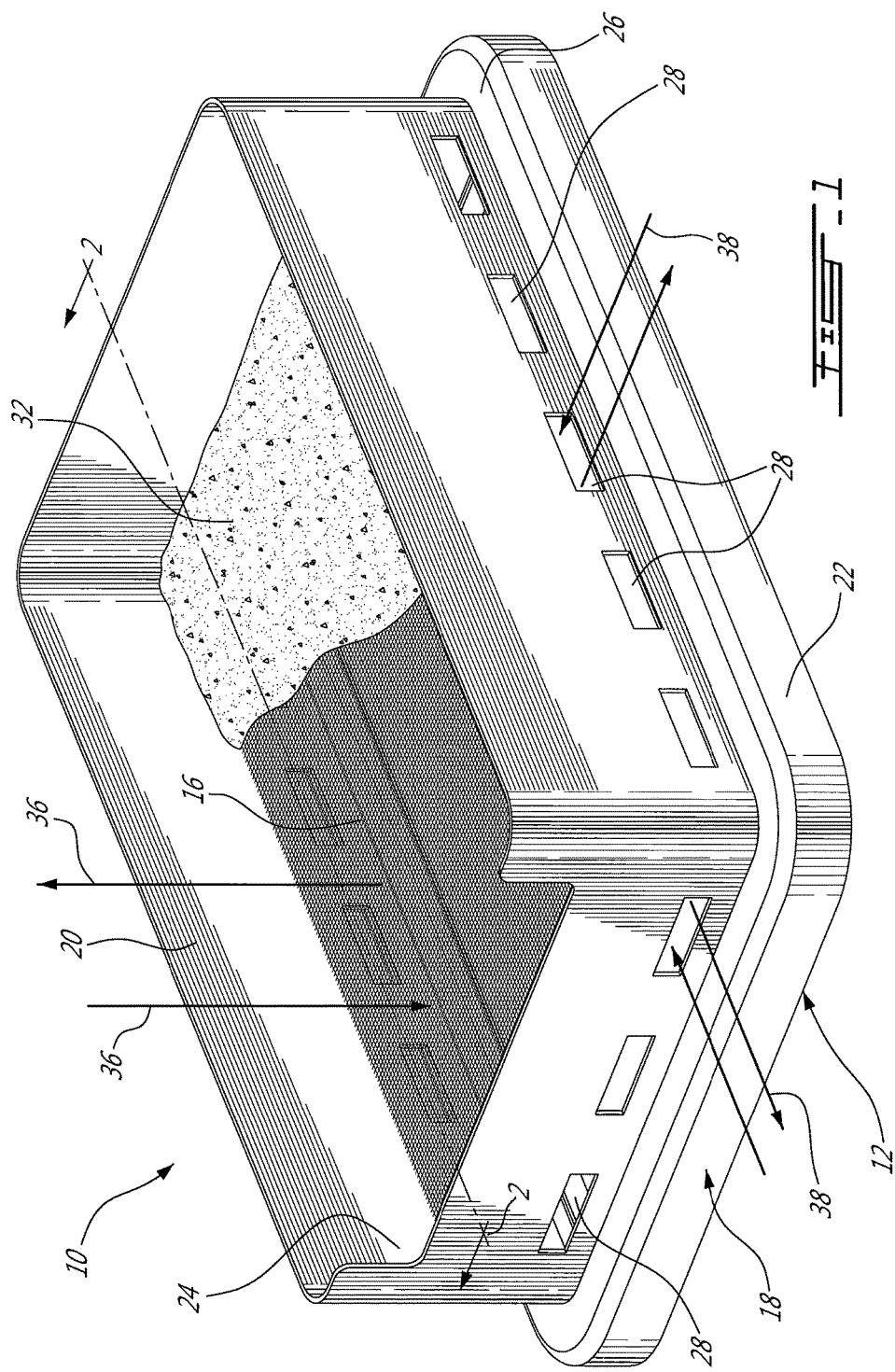

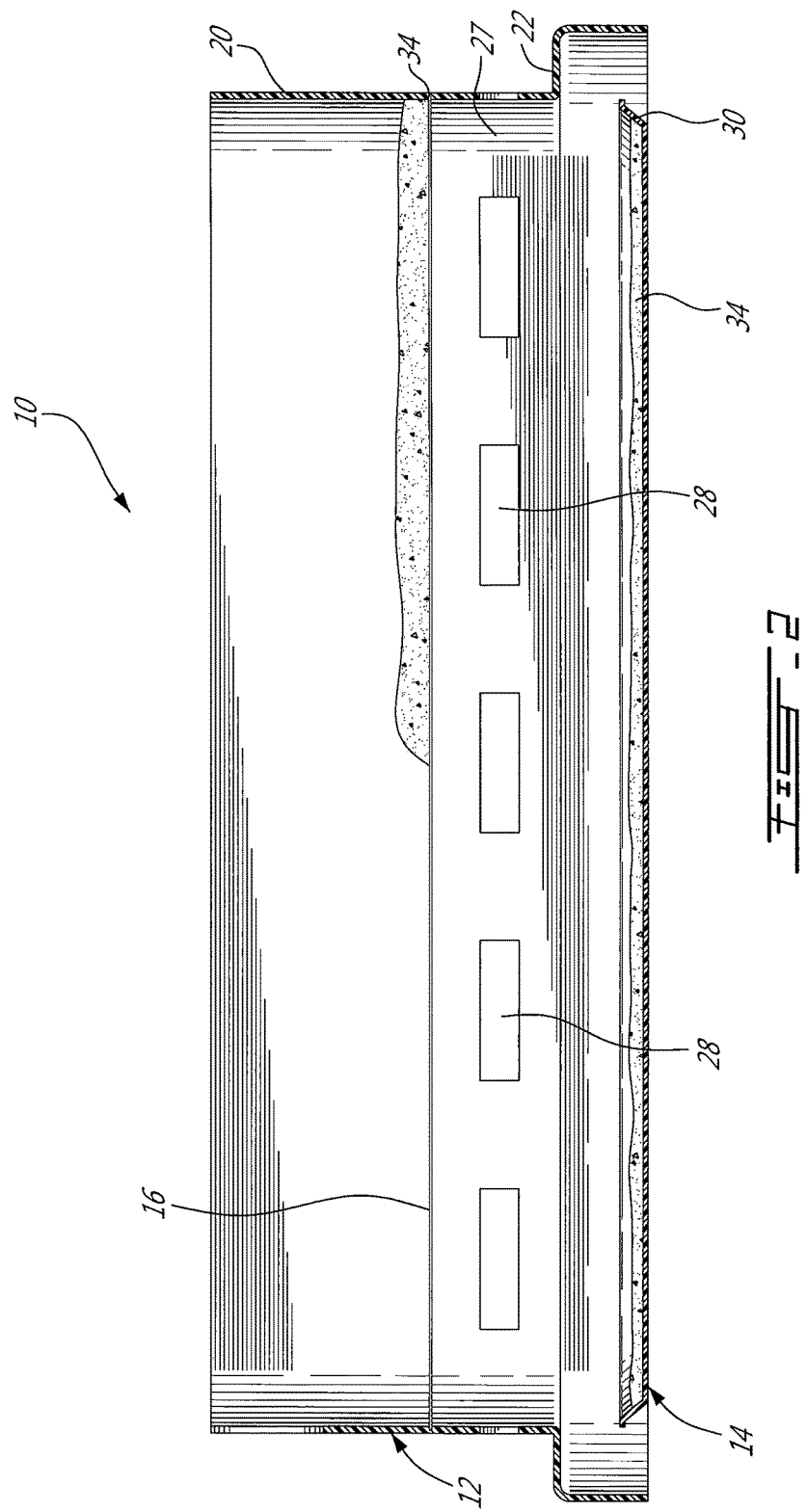

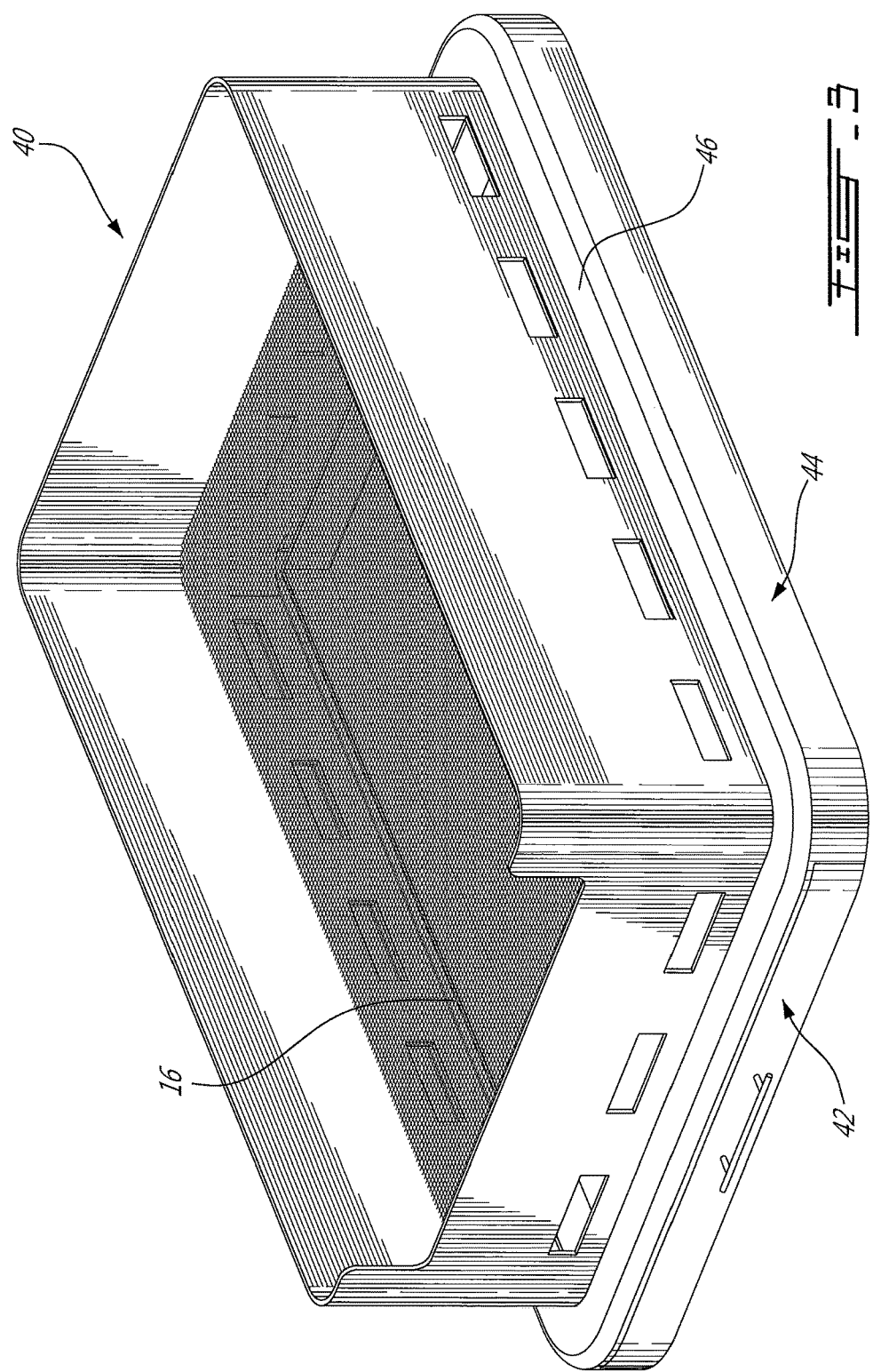

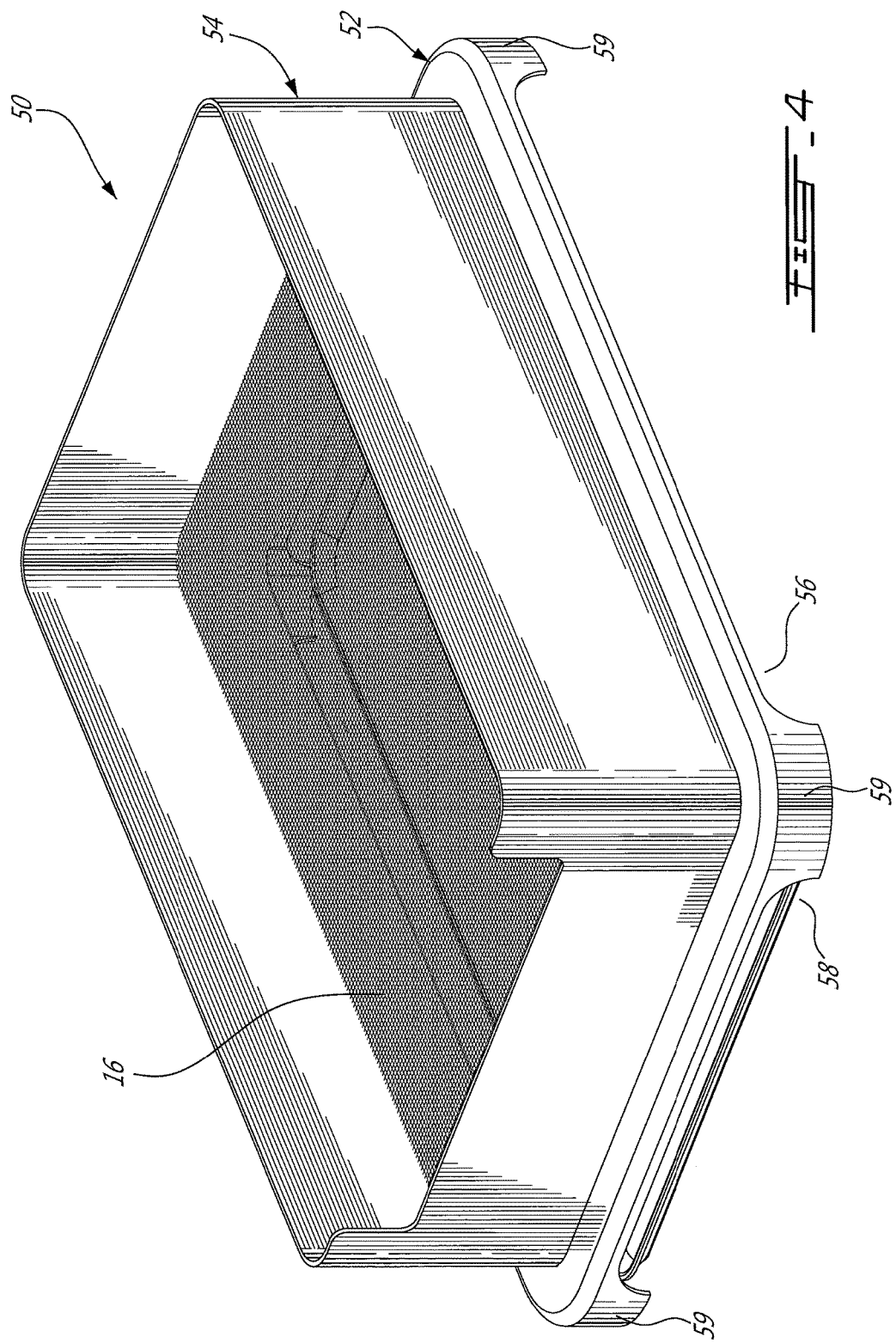

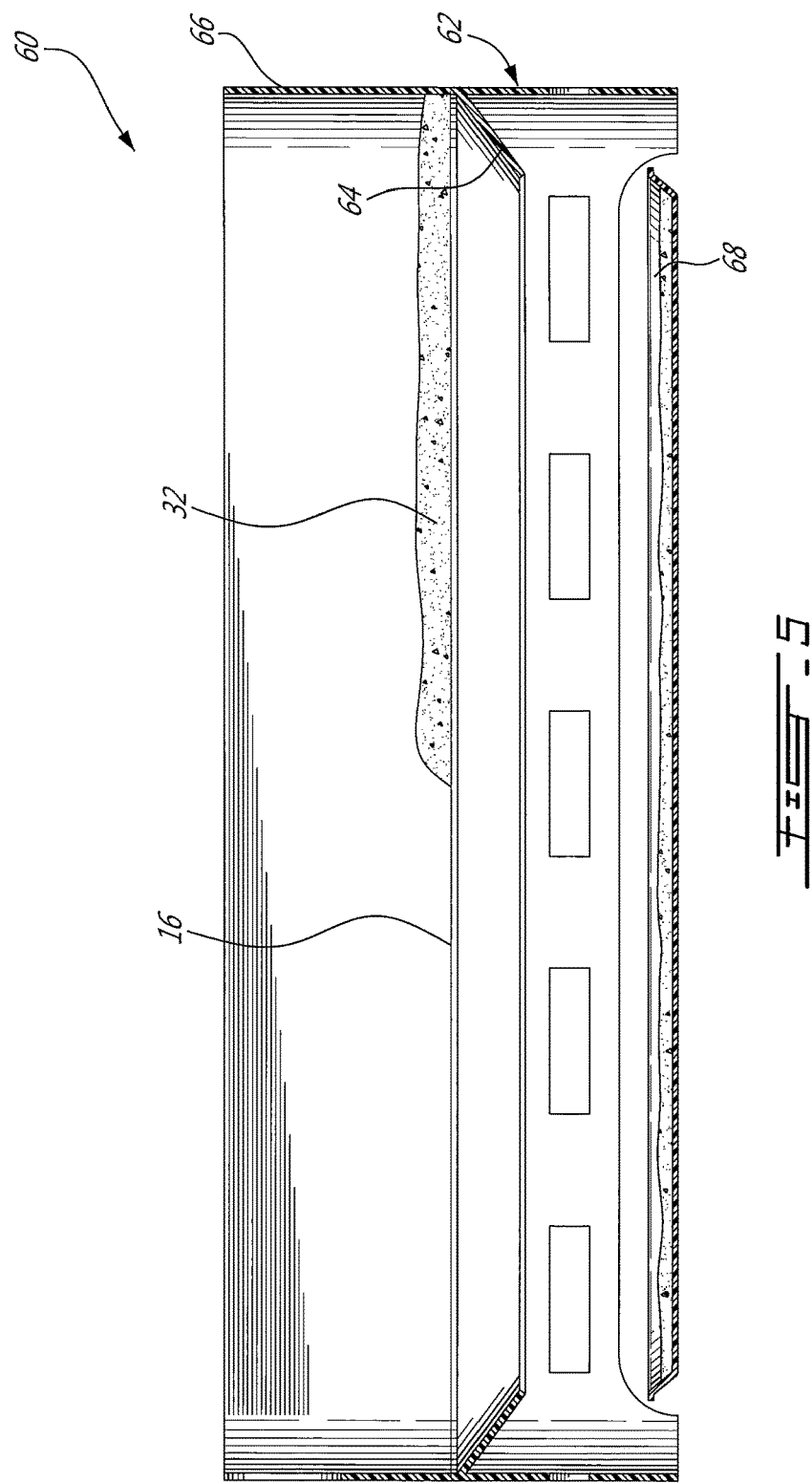

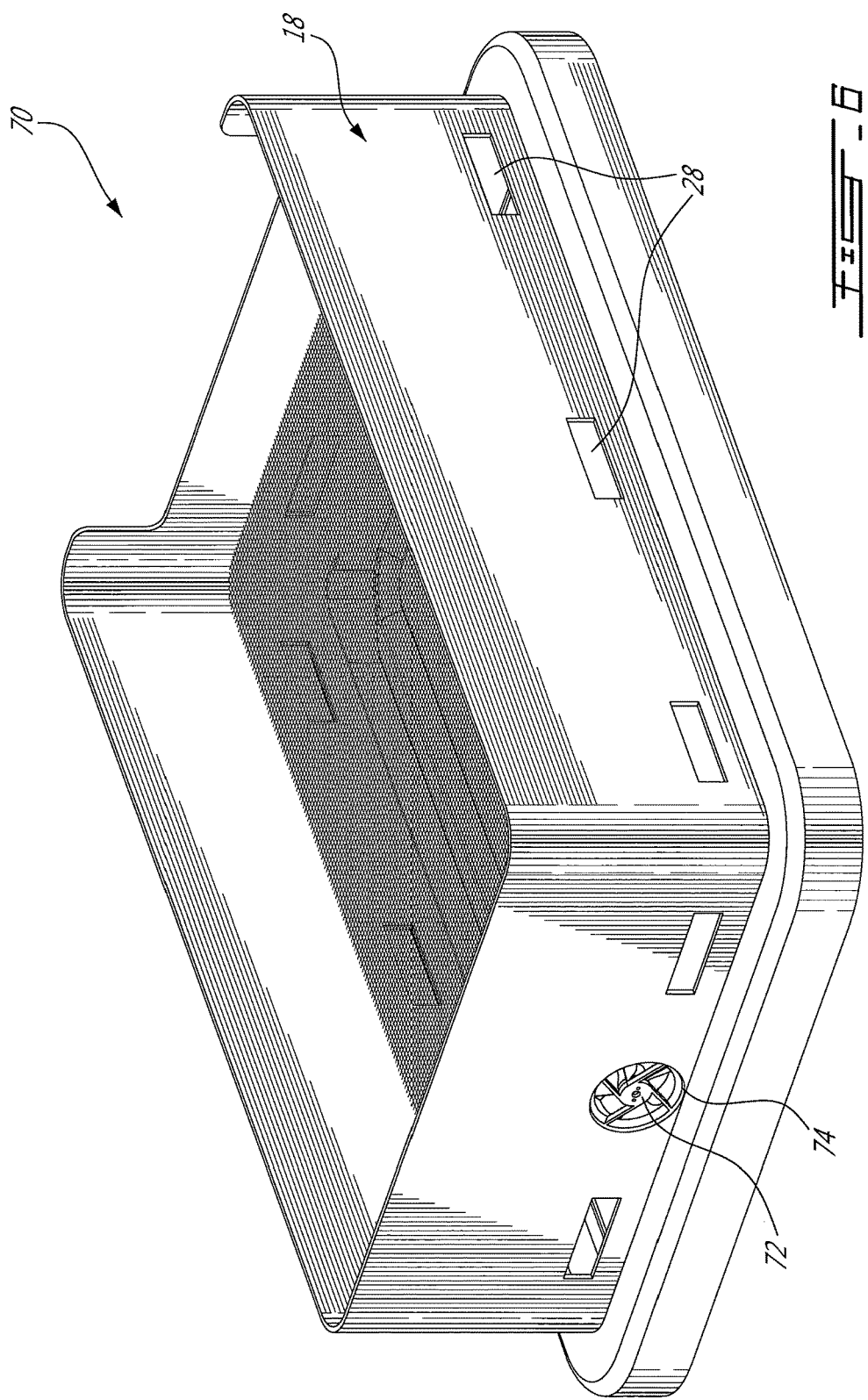

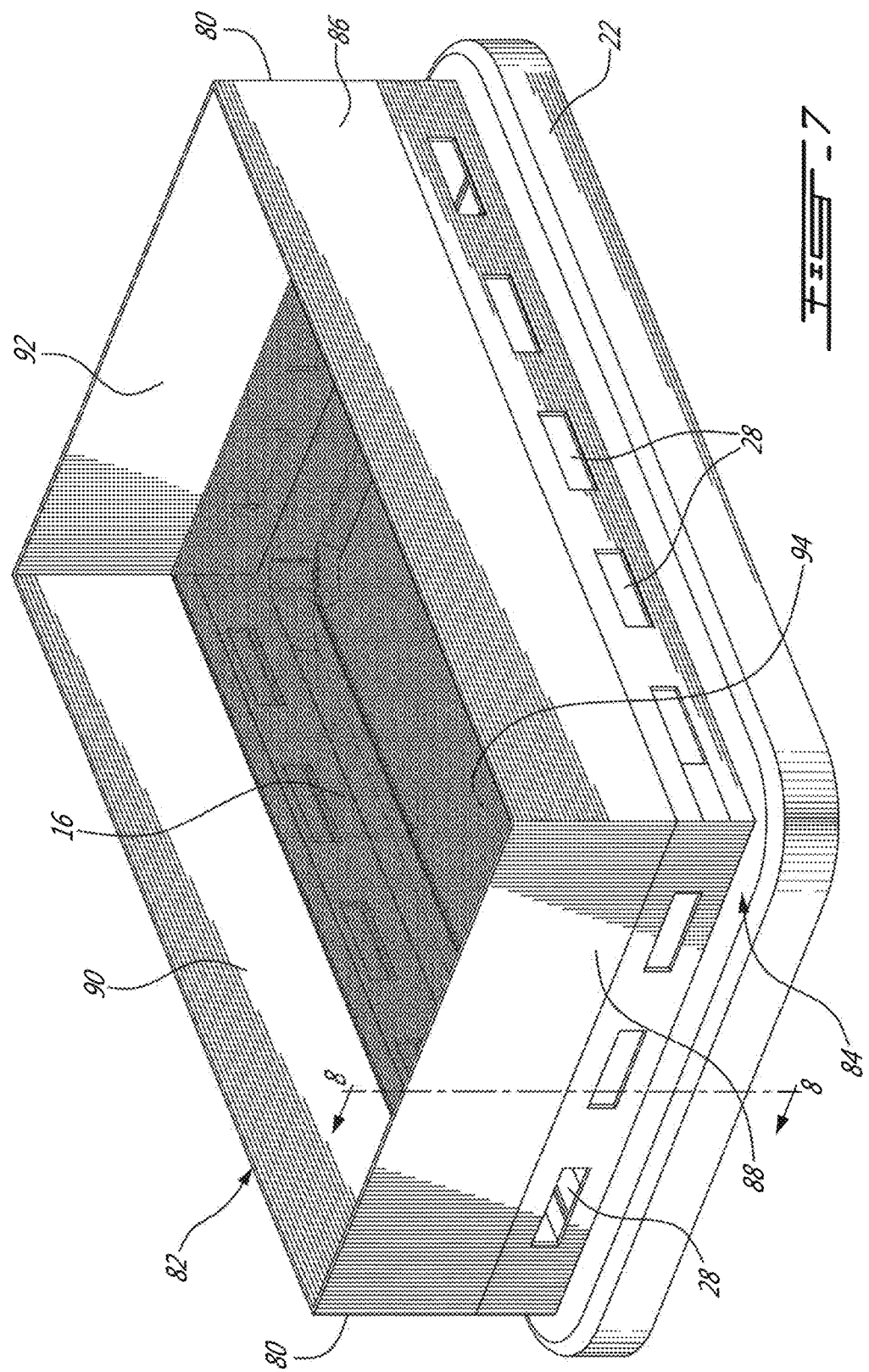

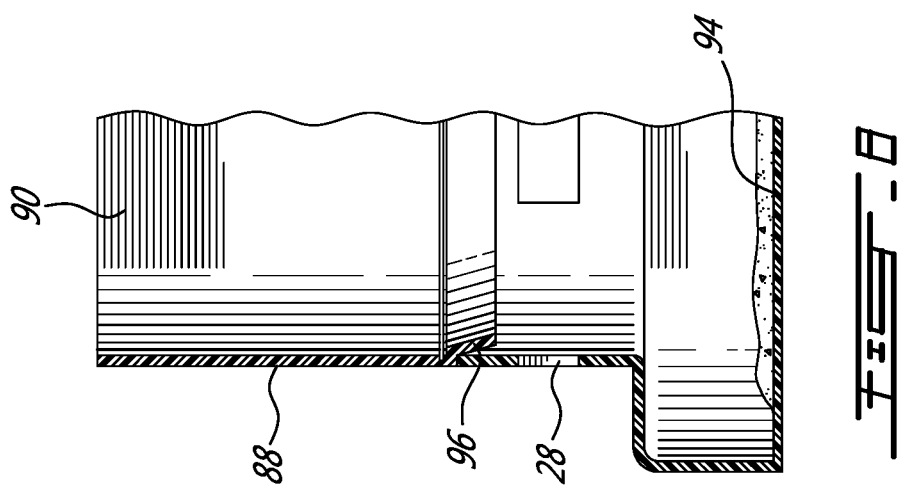

SELF-DRYING LITTER BOX

CROSS REFERENCE TO RELATED APPLICATION

This U.S. application relates to and claims priority to Canadian Application No. 2,731,737, which was filed on Feb. 14, 2011, and the entire disclosure is incorporated herein by reference.

BACKGROUND

The present disclosure relates to domestic animal products.

More specifically, the present disclosure relates to a self-drying litter box.

The typical well-known litter box used for domestic cats is in the form of a rectangular box-like container that is filled with litter material such as sand, clay, zeolite, diatomite, sepiolite, clumping litter material or biodegradable material, including paper.

In view of limiting odors, more complex litter boxes have more recently seen the light of days.

Some of the attempts at preventing or limiting odor to emanate from the litter-box have involved using a two-level box, wherein a top level is configured to receive waste material from the animal, and the lower level is provided to receive the liquid waste from the top level. Often, in such a case, the top level acts as an odor barrier, or, in some other embodiments host a complex mechanism to dry the received waste material. Moreover, most of these litter-boxes require the use of specific and/or proprietary litter materials. This causes problems for some cats that have to adapt to a new litter-box and to a new litter material.

OBJECTS

An object of illustrated embodiments is to provide an improved self-drying litter box.

SUMMARY

In accordance with an embodiment, there is provided a self-drying litter box comprising:

a tray-superposition arrangement having a lower tray and an upper tray; the upper tray being mounted onto the lower tray in spaced relationship so as to define an empty volume therebetween;

the upper tray including a bottom defining a first surface capable of receiving first litter material and waste material thereon; the bottom of the upper tray being provided with apertures for allowing air circulating through the bottom of the upper tray;

the lower tray being capable of receiving a portion of the first litter and waste materials that falls from the upper tray through the apertures; and the tray-superposition arrangement having at least one ventilation opening for allowing at least one of a) the air circulating from the empty volume to outside of the tray-superposition arrangement, and b) the air circulating from the outside of the tray-superposition arrangement to the empty volume;

whereby, in operation, the litter and waste materials in the upper and lower trays are dried by air circulating through the bottom of the upper tray and through the at least one opening.

The at least one ventilation opening in the tray-superposition arrangement and the apertures in the bottom of the upper tray contribute to air circulating between the two trays and between the tray arrangement and outside thereof, which cause any waste material in the upper and lower trays to dry, limiting bacteria proliferation and the resulting odour. This increases the operational duration of the litter material.

In accordance with another embodiment, there is provided a self-drying litter-box comprising:

a lower tray and an upper tray mounted onto the lower tray; both the lower and upper trays being capable of receiving litter material therein; the upper tray having a bottom provided with apertures therein for allowing air circulation between the upper and lower trays; the lower tray having a peripheral wall including openings for allowing air therethrough.

According to still another embodiment, there is provided a self-drying litter box comprising:

a tray-superposition arrangement having a lower tray and an upper tray; the upper tray being mounted onto the lower tray in spaced relationship so as to define an empty volume therebetween;

the upper tray including a bottom defining a first surface capable of receiving first litter material and waste material thereon; the bottom of the upper tray being provided with apertures for allowing air circulating through the bottom of the upper tray;

the lower tray being capable of receiving second litter material and a portion of the first litter and waste materials that falls from the upper tray through the apertures;

the tray-superposition arrangement having at least one ventilation opening for allowing at least one of a) the air circulating from the empty volume to outside of the tray-superposition arrangement, and b) the air circulating from the outside of the tray-superposition arrangement to the empty volume; and means coupled to the tray superposition arrangement to force air circulation through the at least one ventilation opening;

whereby, in operation, the litter and waste materials in the upper and lower trays are dried by air circulating through the bottom of the upper tray and through the at least one opening.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements.

Other objects, advantages and features will become more apparent upon reading of the following non-restrictive description of illustrative embodiments thereof, given by way of example only with reference to the accompanying drawings.

BRIEF DESCRIPTION OF THE DRAWINGS

In the appended drawings:

FIG. 1 is a perspective view of a self-drying litter box according to a first illustrative embodiment;

FIG. 2 is a cross-section taken along line 2-2 in FIG. 1;

FIG. 3 is a perspective view of a self-drying litter box according to a second illustrative embodiment;

FIG. 4 is a perspective view of a self-drying litter box according to a third illustrative embodiment;

FIG. 5 is a perspective view of a self-drying litter box according to a fourth illustrative embodiment;

FIG. 6 is a perspective view of a self-drying litter box according to a fifth illustrative embodiment;

FIG. 7 is a cross-section similar to FIG. 2 of a self-drying litter box according to a sixth illustrative embodiment; and FIG. 8 is a cross-section taken along section line 8-8 in FIG. 7.

DETAILED DESCRIPTION

A self-drying litter box 10 for a cat (not shown) according to a first illustrative embodiment is shown in FIGS. 1 and 2.

The litter box 10 is in the form of an arrangement of two superimposed upper and lower trays 12 and 14.

The upper tray 12 includes a bottom 16, in the form of a screen, and a one-piece moulded peripheral wall 18. The peripheral wall 18, which is generally rectangular with rounded edges, surrounds the bottom 16 and is configured so as to extend both upwardly and downwardly therefrom so as to define respectively an enclosure 20 of the bottom 16 and a stand 22 therefor.

The enclosure 20 includes a rectangular recess 24 in one of the two smaller sides thereof, which defines an entry for the cat.

The stand portion 22 of the peripheral wall 18 includes a shoulder at the end side of the wall 18 opposite the enclosure 20 yielding an enlargement portion 26. The enlargement portion 26 allows removably receiving a lower tray 14 having a greater surface than the bottom 16 under thereof and within the peripheral wall 18. Providing a lower tray 14 which is both larger and longer than the bottom 16 of the upper tray 12 allows recuperating in the lower tray 14 any matter falling from the upper tray 12 through the screen 16.

The upper tray 12 being mounted onto the lower tray in spaced relationship yields an empty volume 27 between the lower tray 14 and the bottom 16 of the upper tray 12, under the bottom 16 of the upper tray 12.

The stand portion 22 of the peripheral wall 18 is provided with rectangular ventilation openings 28, which are leveled with the empty volume 27 and that allow air circulating in and out of the empty volume 27.

The lower tray 14 is generally rectangular and dimensioned to conform to the shape of the enlargement portion 26. The lower tray 14 has a small peripheral flange 30 so as to help contain matter therein during its handling. The lower tray 14 is access able by raising the upper tray 12.

The upper tray 12 allows receiving litter material 32 on the bottom 16 within the enclosure 20. Any type of litter material can be used, including silica gel, pine pellets, paper, clumping material, sand, etc.

The screen 16 is configured so as to retain the litter material 32. More specifically, the dimension of the apertures in the bottom screen 16 is such as to minimize the passage of litter material therethrough while allowing passage to air and to waste in liquid form therethrough. Typically, the apertures are between about 0.25 mm and 0.75 mm in diameter. The apertures of the screen 16 is however not limited to this range.

The screen 16 is also sufficiently rigid so as to support the weight of the animal for which the litter-box 10 is conceived. According to a further embodiment, the screen 16 is reinforced by a frame or another similar structure (not shown).

According to the first illustrated embodiment, the lower and upper trays are made of a polymeric material, including the bottom 16 of the upper tray 12. The components of the litter box 10 may result from a moulding process. The bottom screen 16 can be positioned during such a moulding process or afterwards. According to the first illustrative embodiment, a peripheral groove 34 is provided on the inner side of the peripheral wall 18 to receive the screen 16.

According to another embodiment (not shown), the inner side of the peripheral wall 18 includes a shoulder to receive the screen 16 thereon.

According to other embodiments, the screen 16 is made of metal.

Further characteristics of the litter box will become more apparent upon reading the following description of the operation thereof.

The surface of the bottom 16 of the upper tray 12 is covered with litter materials 32. The quantity of litter materials 32 should be sufficient to allow a cat to bury its waste as it is well-known to be a conventional habit for such an animal. More or less litter material can of course be used.

The lower tray 14 allows receiving any of the first litter 32 and waste materials (not shown) that pass through the bottom screen 16 of the upper tray 12. This can happen by gravity or following pressure or friction in the enclosure 20, for example as a result of the cat trying to hide his waste as it is customary from such species. As such, litter material 34 may also be added in the lower tray 14.

Since the upper tray 12 is configured to allow a limited portion of the waste material from the upper tray 12 to fall in the lower tray 14, a small quantity of litter material 34 can be added in the lower tray 14, for example sufficiently to minimize soiling of the surface of the lower tray 14.

The solid waste material in the litter box 10 and litter material wet by liquid waste are dried by the air circulating through the openings of the screen 16 and the ventilation openings 28 (see arrows 36 and 38). Providing an empty space 27 below the screen 16 at the level of the openings 28 allows maximizing air circulation throughout the litter-box 10.

Since the animal wastes are dried continuously, the proliferation of bacteria in the litter box 10 and the spread of odours therein are minimized.

Also, considering that the pet owner removes the solid waste materials and any agglomeration of litter material if clumping material is used, the litter box 10 requires less frequent washing than conventional litter box to provide the same comfort for his/her cat and him/her. The litter box 10 also requires adding less frequently litter materials 32 than conventional litter box.

The expression "screen" should be construed herein in a broad way, so as to encompass any generally flat member pierced with apertures.

The bottom 16 of the upper tray 12 can therefore take any form that includes apertures to allow air circulation therethrough.

The litter material 34 in the lower tray 14 can be different than the litter material 32 in the upper tray 12. The litter material in the lower tray may also be omitted.

The litter box 10 is not limited to any distance between the bottom screen 16 and the lower tray 14, provided that such a distance is sufficient to promote air circulation between the bottom 16 of the upper tray 12 and the lower tray 14.

The litter box 10 is not limited to the illustrated rectangular shape and can be round, oval, irregular, etc.

According to another embodiment (not shown), the number, geometry and positions of the ventilation openings are different than those illustrated in FIGS. 1 and 2 as long as they promote air circulation under the upper tray.

It is to be noted that there are no functional limit to the oversize of the lower tray compared to the bottom of the upper tray.

A self-drying litter box 40 according to a second illustrative embodiment will now be described with reference to FIG. 3. Since the litter box 40 is similar to the litter box 10, only the differences between these two litter boxes will be described herein for concision purposes.

The lower tray 42 is in the form of a drawer slidably mounted to the upper tray 44 therein. The enlargement 46 of the upper tray 44 is adapted to snugly receive the tray 42. More specifically, a rectangular opening, which is complementary shaped to the width of the drawer 42, is provided in the enlargement portion 46. According to the illustrated embodiment, the drawer 42 as a width and a length sufficient to cover at least the surface of the screen 16.

A self-drying litter box 50, according to a third illustrative embodiment, will now be described with reference to FIG. 4. Since the litter box 50 is similar to the litter box 10, only the differences between these two litter boxes will be described herein for concision purposes.

The enlargement portion 52 of the upper tray 54 includes four elongated recesses 56 and 58 (only two shown), each extending on a respective side of the enlargement portion so as to define four corner legs 59 (only three shown) and four ventilation openings therebetween. According to this third illustrative embodiment, ventilation openings in the stand portion of the upper tray 54 are omitted. According to a further embodiment (not shown), one or more additional ventilation openings are further provided in the peripheral wall just below the screen 16.

FIG. 5 illustrates a self-drying litter-box 60 according to a fourth illustrative embodiment. Since the litter boxes 60 and 10 are similar, only the differences therebetween will now be described.

The stand portion 62 is provided with a peripheral flange 64 extending from within the peripheral wall 66. The flange 64 is inclined inwardly so as to define a funnel to guide in the lower tray 68 any waste and litter materials falling through the bottom screen 16. According to this embodiment, the enlargement portion 26 in the stand portion is omitted. Indeed, the funnel 64 acts as a mean to insure that any material passing through the screen 16 falls in the lower tray 68. To be accommodated under the bottom screen 16, the lower tray 68 has a surface equal or smaller than the bottom 16.

According to another embodiment (not shown), a funnel similar to the funnel 64 is provided on the litter box 10.

FIG. 6 shows a litter box 70 similar to the litter box 10 that includes, as a difference, a motorized fan 72 inserted in a ventilation opening 74 leveled with the other ventilation openings 28. The fan 72 allows forcing the air circulation described hereinabove. The fan 72 can be energized for example using any conventional means, including batteries or connection to the power grid (both not shown). The distance between the bottom screen 16 and the lower tray 14 is sufficient to allow the fan 72 to be operatively received on the peripheral wall 18 so as to be registered with the volume 27.

According to another embodiment, more than one fan 72 is provided. According to still another embodiment, the fan 72 is removably mounted to any one of the ventilation opening 28 or more generally to the litter-box, inside or outside thereof, using a mounting bracket and/or a casing (not shown). Such mounting bracket or casing can be configured so as to be clipped onto a ventilation opening 28 or fastened onto the peripheral wall 18 so as to be operative through the opening 28.

According to another embodiment (not shown), the peripheral wall 18 includes a single opening that operatively receives the fan 72.

The conventional fan 72 can be replaced by any air moving means such as, without limitation, a squirrel cage type of fan.

A self-drying litter 80 according to a sixth illustrative embodiment is illustrated in FIG. 7. Since the litter 80 is similar to the litter 10, only differences therebetween will now be described for concision purposes.

The litter box 80 includes an upper tray 82 that is removably mounted onto a lower tray 84.

The upper tray 82 is in the form of a rectangular box-like container having a bottom in the form of a screen 16 and four lateral walls 86-92 secured thereto. A short inwardly tapered skirt 96, shown in FIG. 8, extends from the walls 86-92. The skirt allows easy mounting of the upper tray 82 onto the lower tray 84 in a snugly fitting relationship. Other mounting arrangement can be provided.

The lower tray 84 is in the form of the stand portion 22 from FIG. 1 provided with a bottom 94.

According to a further embodiment (not shown), the enlargement portion is omitted in the lower tray 84.

The operation of the litter box 80 is similar to the operation of the litter box 10 from FIG. 1, and the bottom of the lower tray 84 can be accessed by raising the upper tray 82.

To improve the stability of the upper and lower tray assembly, the two trays 82 and 84 have similar rectangular shapes and sections. According to a further embodiment (not shown), the general shapes and/or sizes of the two trays 82 and 84 differ, apart from the top end section of the lower tray 84 and the lower end section of the upper tray 82 which are similar so as to be joined.

According to still another embodiment (not shown), the two trays 82-84 include well-known coupling means to contribute improving their interconnection and stability.

According to another embodiment (not shown), some or all of the apertures 28 are substituted by recesses in the peripheral wall of either one of the upper and lower trays 82 and 84 so as to define side opening with the peripheral wall of the other one of the upper and lower trays 82-84.

The application of the litter boxes according to the illustrated embodiments is not limited to cat. They can be adapted as an animal litter box for other domestic animals such as dogs and rabbits.

It is to be noted that many modifications could be made to the animal litter boxes described hereinabove and illustrated in the appended drawing. For example:
  a ramp or a step (not shown) can be provided on any side of the litter box to ease the entering of the domestic animal therein. Such a ramp or step could be provided with apertures or slits (not shown) to allow for air circulation and/or an embossed surface, grooves or any other means contributing to remove litter material attached to the animal paws when the animal exits the litter box. The ramp and litter box can be configured so that such litter material would fall in the lower tray;
  drying, absorbent, adsorbent, deodorant products, including without limitations essential oil, and/or disinfectant product or system, such as ultraviolet-based system can be added in any one of the upper and lower trays so as to improve odour control. Such an additional element can be mounted or associated to a fan so as to improve its efficiency;

an activated carbon filter, peat or else can be further used to improve odour control. Such additional odour control means can be added to the natural ventilation or to any forced ventilation system added;

the enclosure portion of the peripheral wall of the upper tray can be provided with height-adjustable elements;

the bottom screen of the upper tray can be in the form of a metal or plastic mesh or it can be made of any other material. The screen can be fixedly or removably mounted to the peripheral wall so as to be replaceable;

each of the upper and lower trays can be made of plastic, or of any other material;

the litter box can further include a cover, removably or fixedly mounted onto the upper tray.

It is to be understood that the invention is not limited in its application to the details of construction and parts illustrated with reference to embodiments thereof in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention.

What is claimed is:

1. A self-drying litter box comprising:
a tray-superposition arrangement having a lower tray and an upper tray; the upper tray being removably mounted onto the lower tray in spaced relationship so as to define an empty volume therebetween;
the upper tray including a bottom defining a first surface capable of receiving first litter material and waste material thereon; the bottom of the upper tray being provided with apertures for allowing air circulating through the bottom of the upper tray, to dry the first litter and waste materials thereon; the upper tray further comprising a peripheral wall extending upwardly from the bottom, and a connecting skirt extending inwardly with respect to the peripheral wall of the upper tray and downwardly with respect to the bottom of the upper tray, the connecting skirt extending continuously adjacent to a periphery of the upper tray;
the lower tray comprising a bottom defining a second surface and a peripheral wall extending upwardly from the bottom, the upper tray abutting against an upper edge of the peripheral wall of the lower tray with the bottom of the upper tray extending from a junction of the peripheral walls of the upper and lower trays and the connecting skirt extending inwardly from the peripheral wall of the lower tray, into the empty volume and towards the bottom of the lower tray;
the bottom of the lower tray being capable of receiving a portion of the first litter material and waste materials that falls from the upper tray through the apertures defined in the bottom of the upper tray;
the peripheral wall of the lower tray being provided with at least one ventilation opening for allowing at least one of a) air circulating from the empty volume to outside of the tray-superposition arrangement, and b) air circulating from the outside of the tray-superposition arrangement to the empty volume; and
whereby, in operation, the litter and waste materials in the upper and lower trays are dried by air circulating through the bottom of the upper tray and through the at least one ventilation opening.

2. A self-drying litter box as recited in claim 1, wherein the bottom of the upper tray is a screen.

3. A self-drying litter box as recited in claim 1, wherein the connecting skirt comprises a free end portion extending in an inner volume defined by the peripheral wall of the lower tray.

4. A self-drying litter box as recited in claim 1, wherein at least one of the peripheral wall of the upper tray and the lower tray is made of a polymeric material.

5. A self-drying litter box as recited in claim 1, wherein the lower tray is in the form of a box-like container configured and sized to receive the upper tray thereon in a superposition arrangement.

6. The self-drying litter-box as recited in claim 1, wherein the bottom of the upper tray being in the form of a screen; the apertures therein being between about 0.25 mm and about 0.75 mm in diameter.

7. The self-drying litter-box as recited in claim 1, wherein the peripheral wall of the upper tray is coplanar with at least a portion of the peripheral wall of the lower tray.

8. The self-drying litter-box as recited in claim 1, wherein the bottom of the lower tray forms a stand portion of the self-drying litter-box, the bottom being capable of receiving the portion of the first litter material and the waste materials that falls from the upper tray through the apertures.

9. The self-drying litter-box as recited in claim 1, wherein the bottom of the upper tray extends inwardly from the junction of the peripheral wall of the upper tray and the connecting skirt.

10. The self-drying litter box as recited in claim 1, wherein the connecting skirt delimits a connecting skirt surface in a plane substantially parallel to the first surface of the bottom of the upper tray, said the connecting skirt surface having a smaller surface area than a surface area of the first surface of the bottom of the upper tray.

11. The self-drying litter box as recited in claim 1, wherein said at least one ventilation opening of the lower tray comprises an upper end, and wherein the connecting skirt comprises a free end portion extending above the upper end of said at least one ventilation opening for the connecting skirt not to prevent said at least one of a) air circulating from the empty volume to outside of the tray-superposition arrangement, and b) air circulating from the outside of the tray-superposition arrangement to the empty volume.

12. A self-drying litter box comprising:
an upper tray including a bottom defining a first surface, a peripheral wall extending upwardly from the bottom, and a connecting skirt extending downwardly from the bottom and the peripheral wall, the first surface being configured to receive first litter material and waste material thereon and the bottom comprising apertures for allowing air circulating therethrough to dry the first litter and waste materials supported by the first surface, and the connecting skirt extending inwardly with respect to the peripheral wall and continuously with respect to a periphery of the upper tray; and
a lower tray including a bottom defining a second surface and a peripheral wall extending upwardly from the bottom of the lower tray and including a plurality of spaced-apart ventilation openings extending therethrough, the upper tray being removably superposable onto the lower tray with the second surface extending below the first surface, when the upper and lower trays are superposed, to define an empty volume inbetween and to be configured to receive a portion of the first litter material and waste materials that falls from the upper tray through the apertures defined in the bottom of the upper tray; wherein when the upper and the lower trays are superposed, the upper tray rests against an upper edge of the peripheral wall of the lower tray; and wherein the connecting skirt extends inwardly from the peripheral wall of the lower tray and ends above the ventilation openings defined therein to allow at least one of a) air circulating from the empty volume to outside of the litter box, and b) air circulating from the outside of the litter box to the empty volume;

whereby, in operation, the litter and waste materials in the upper and lower trays are dried by air circulating through the bottom of the upper tray and through the ventilation openings.

13. A self-drying litter box as recited in claim 12, wherein the connecting skirt has a substantially inwardly tapered shape so as to define a funnel.

14. A self-drying litter box as recited in claim 12, wherein the connecting skirt extends in the empty volume between the bottoms of the upper tray and the lower tray.

15. A self-drying litter box as recited in claim 12, wherein the connecting skirt delimits at a free end portion thereof a connecting skirt surface in a plane substantially parallel to the first surface of the bottom of the upper tray, said connecting skirt surface having a smaller surface area than a surface area of the first surface of the bottom of the upper tray.

16. A self-drying litter-box as recited in claim 12, wherein the bottom of the upper tray is in the form of a screen, the apertures therein being between about 0.25 mm and about 0.75 mm in diameter.

17. A self-drying litter-box as recited in claim 12, wherein the bottom of the upper tray extends inwardly from the junction of the peripheral wall and the connecting skirt of the upper tray.

18. A self-drying litter box as recited in claim 12, wherein the connecting skirt defines an oblique inclination angle with respect to the peripheral wall of the upper tray.

* * * * *